US 7,467,822 B2

United States Patent
Manders

(10) Patent No.: US 7,467,822 B2
(45) Date of Patent: Dec. 23, 2008

(54) OPEN ROOF CONSTRUCTION FOR A VEHICLE AND WIND DEFLECTOR

(75) Inventor: Peter Christiaan Leonardus Johannes Manders, Horst (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 11/589,670

(22) Filed: Oct. 30, 2006

(65) Prior Publication Data

US 2007/0096509 A1   May 3, 2007

(30) Foreign Application Priority Data

Oct. 31, 2005   (EP)   ................... 05110182

(51) Int. Cl.
*B60J 7/22*   (2006.01)
(52) U.S. Cl. ................................................. 296/217
(58) Field of Classification Search ................ 296/217
See application file for complete search history.

(56) References Cited

U.S. PATENT DOCUMENTS

| 4,702,518 | A | * | 10/1987 | Paerisch et al. ............. 296/217 |
| 4,966,409 | A | * | 10/1990 | Schmidhuber et al. ...... 296/213 |
| 5,178,436 | A |   | 1/1993  | Eberius et al. ............... 296/217 |
| 6,457,769 | B2 | * | 10/2002 | Hertel et al. ................. 296/217 |
| 6,666,503 | B1 | * | 12/2003 | Sorensen .................... 296/217 |
| 7,121,618 | B2 | * | 10/2006 | Uehara et al. ............... 296/217 |
| 2003/0168892 | A1 |   | 9/2003 | Bohm et al. ................. 296/217 |
| 2004/0189057 | A1 |   | 9/2004 | Grimm et al. |
| 2005/0258669 | A1 |   | 11/2005 | Manders |

FOREIGN PATENT DOCUMENTS

| DE | 3419900    | * | 11/1985 | ................. 296/217 |
| DE | 3641033    | * | 6/1988  | ................. 296/217 |
| DE | 4039485    |   | 5/1992  | |
| DE | 101 37 363 C |   | 11/2002 | |
| DE | 10336361 B3 |   | 6/2005  | |
| EP | 0 490 213 A |   | 6/1992  | |

OTHER PUBLICATIONS

Official Search Report of the European Patent Office in counterpart foreign application No. EP 05110182 filed Oct. 31, 2005.

\* cited by examiner

*Primary Examiner*—Dennis H Pedder
(74) *Attorney, Agent, or Firm*—Steven M. Koehler; Westman, Champlin & Kelly, P.A.

(57) ABSTRACT

An open roof construction for a vehicle comprises a roof opening which is provided in a stationary roof part of the vehicle, a movable panel for selectively opening and closing said roof opening, and a wind deflector positioned at the frontal edge of the roof opening, which wind deflector is provided with an upper frame member and a flexible member attached with one edge to said upper frame member. The upper frame member is substantially rigid and the flexible member is attached to said upper frame member through a tensioning means for keeping the flexible member taut over its entire width.

13 Claims, 3 Drawing Sheets

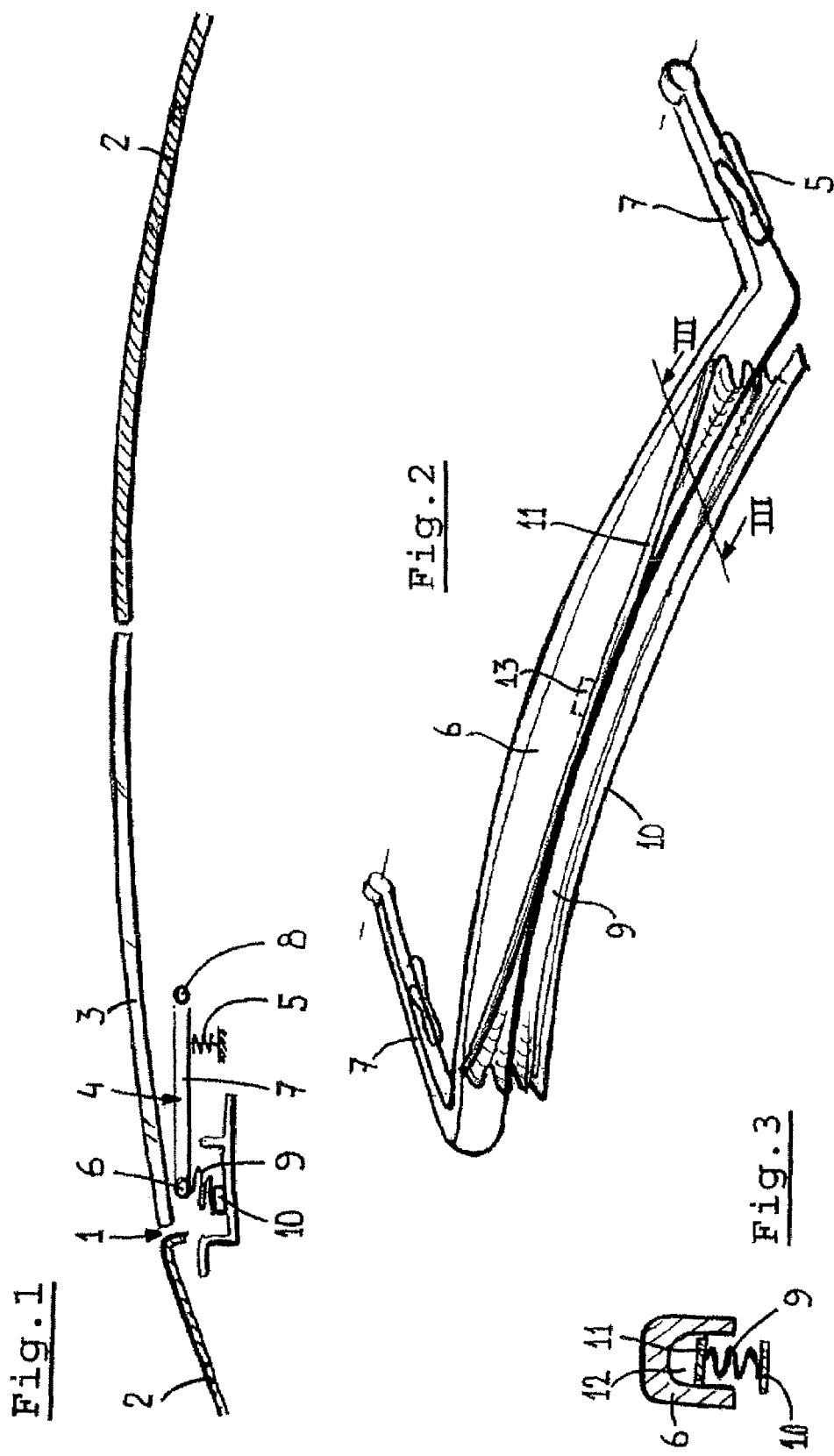

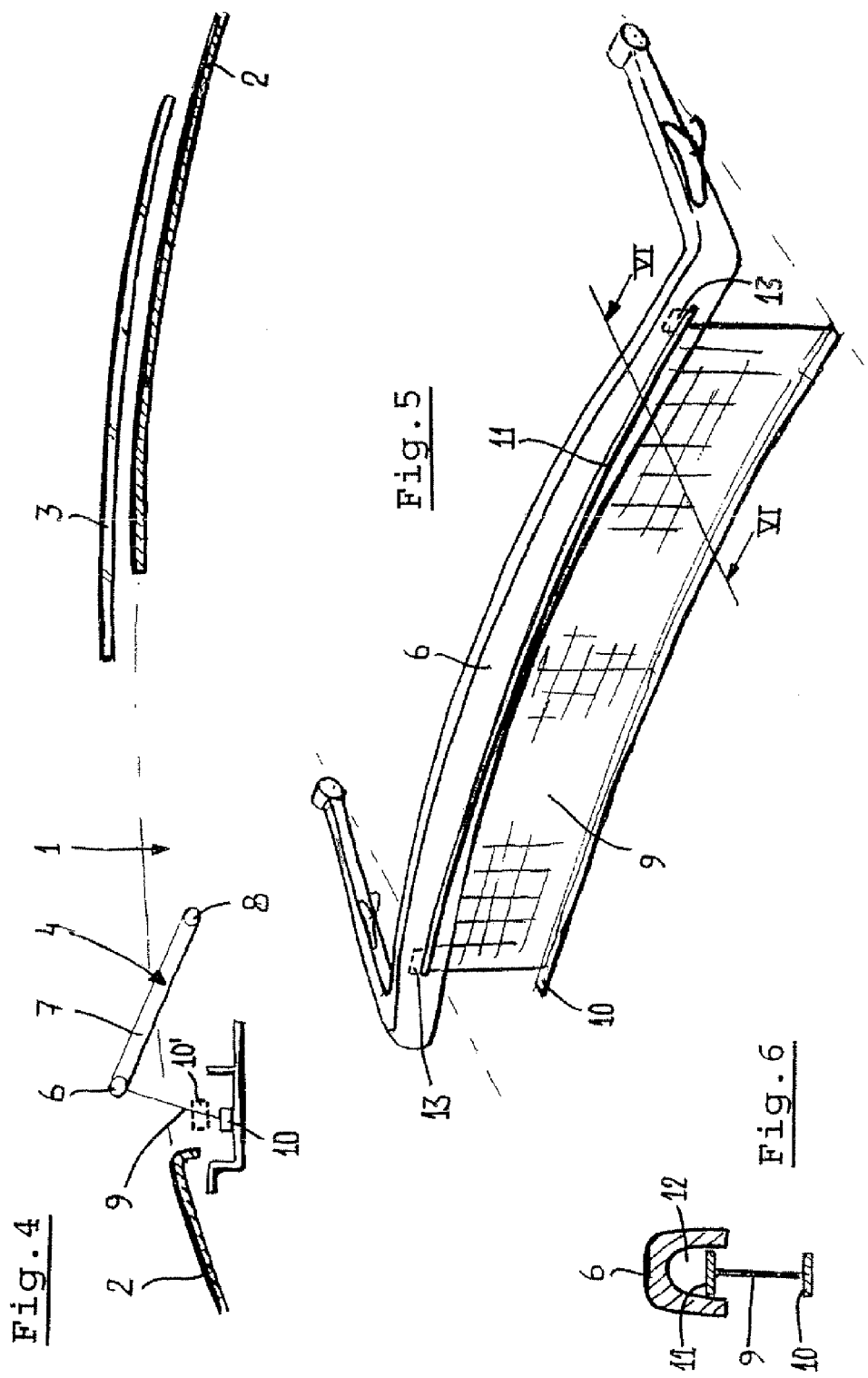

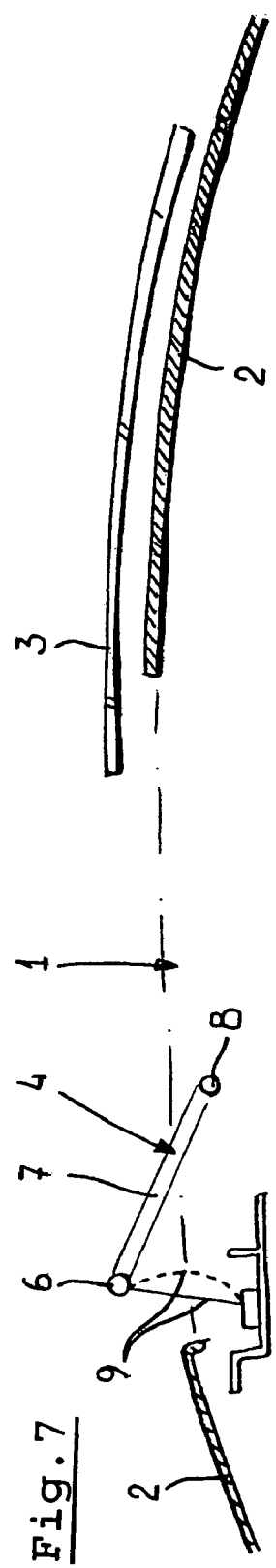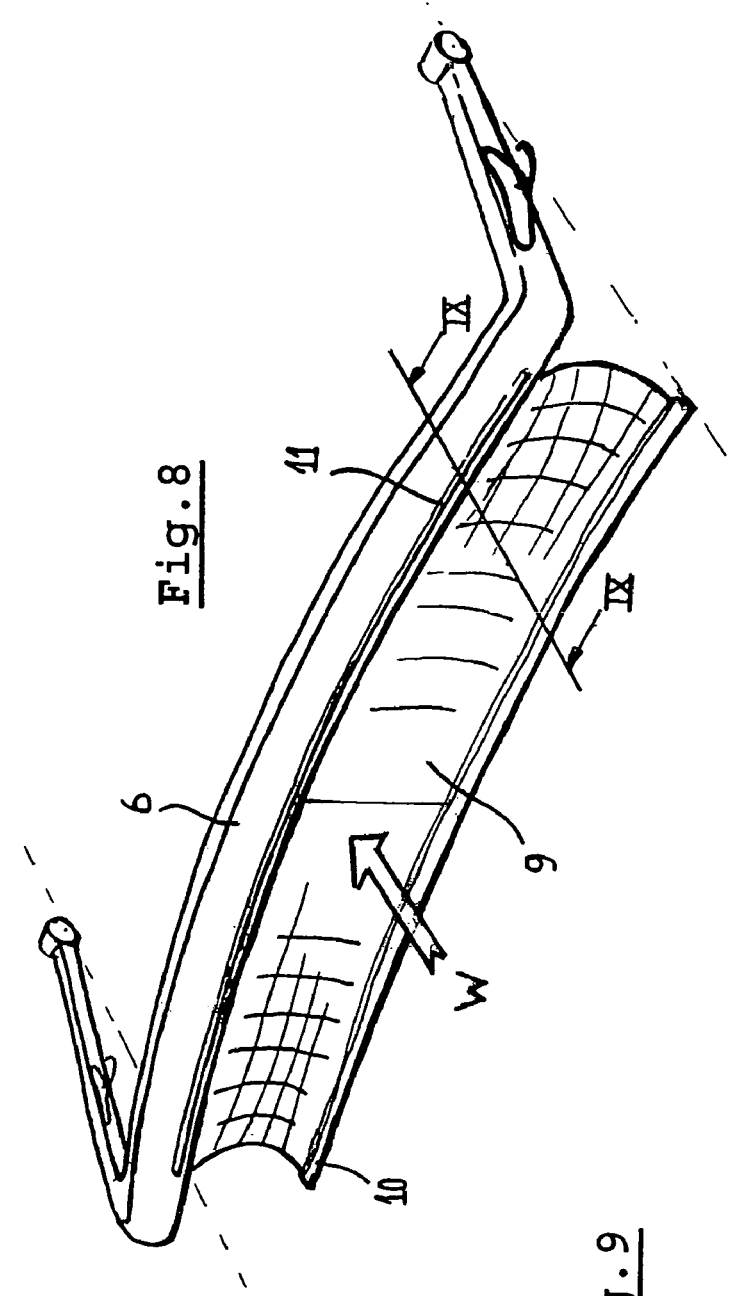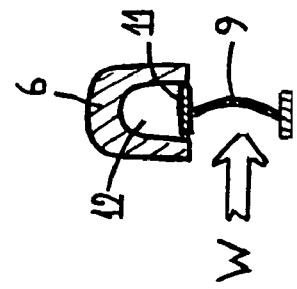
Fig.7
Fig.8
Fig.9

OPEN ROOF CONSTRUCTION FOR A VEHICLE AND WIND DEFLECTOR

BACKGROUND

The discussion below is merely provided for general background information and is not intended to be used as an aid in determining the scope of the claimed subject matter.

The concepts herein described can relate to an open roof construction for a vehicle, comprising a roof opening which is provided in a stationary roof part of the vehicle, a movable panel for selectively opening and closing said roof opening, and a wind deflector positioned at the frontal edge of the roof opening, which wind deflector is provided with an upper frame member and a flexible member attached with one edge to said upper frame member.

The wind deflector provided in such an open roof construction is a device that generally projects upwardly along the frontal edge of the roof opening. As the vehicle moves forward, the wind deflector deflects the air which otherwise would cause disturbing noises when the movable panel is in a position for opening said roof opening.

Recent types of open roof constructions comprise wind deflectors which, at least partially, are made from a flexible material of some sort, thus reducing the overall weight of the wind deflector. Further, when the wind deflector is of a type which is movable between a retracted position and an extended position, the use of such flexible materials reduces the storage space needed for the wind deflector in its retracted position within the stationary roof part.

However, with this type of wind deflector it is very difficult to make sure that the entire wind deflector (and, especially, its flexible member) is tensioned over its entire width. Often one can see, that the transversally outer ends of the flexible member are taut, whereas its inner section is not perfectly so. Not only does this provide a wind deflector with an unattractive appearance, but also does it negatively influence the efficiency in deflecting the air in a proper manner. In some cases even such a wind deflector can actually increase the noise level in the vehicle due to resonance of the flexible material. Moreover, an increase of wear will then occur.

Attempts have been made to overcome such problems. One such an attempt is shown in U.S. Pat. No. 6,666,503. In accordance with the solution shown therein, the upper frame member is upwardly bent to provide a predetermined tension over the width of the flexible member. Such a solution, however, means that the upper frame member itself is flexible, but such a flexible upper frame member is not sufficiently rigid to fulfil specific demands.

SUMMARY

This Summary and Abstract are provided to introduce some concepts in a simplified form that are further described below in the Detailed Description. This Summary and Abstract are not intended to identify key features or essential features of the claimed subject matter, nor are they intended to be used as an aid in determining the scope of the claimed subject matter. In addition, the description herein provided and the claimed subject matter should not be interpreted as being directed to addressing any of the short-comings discussed in the Background.

An open roof construction or assembly for a vehicle having a roof opening provided in a stationary roof part of the vehicle includes a movable panel for selectively opening and closing said roof opening. A wind deflector positioned at the frontal edge of the roof opening is provided with an upper frame member and a flexible member attached with one edge to said upper frame member. The upper frame member is substantially rigid and the flexible member is attached to said upper frame member through a tensioning device for keeping the flexible member taut over its entire width.

The upper frame member is substantially rigid. This means, that its shape is maintained during all operational stages in such a manner, that it can fully comply with all requirements. The tensioning device between the substantially rigid upper frame member and the flexible member, however, will keep the flexible member taut over its entire width, notwithstanding the rigidity of the upper frame member. As a result, a wind deflector is obtained which maintains its optimal shape, as well as with respect to its flexible member as with respect to its upper frame member, during all operational stages.

In an embodiment of the open roof construction, the upper frame member is provided with a recess for movably housing the tensioning device. As a result, the tensioning device is hidden from an outer view, thus not influencing the appearance of the wind deflector, and further will not be subject to outer influences, which might cause a deterioration of its functioning.

For example, the upper frame member at least partially could have a substantially inverted U-shaped cross section. Within such an inverted U-shaped cross section the tensioning device then will be housed.

In an embodiment of the open roof construction, the tensioning device is a leaf spring. Of course, in such a case, the main direction in which such a leaf spring extends will be the direction in which the upper frame member extends (i.e. generally the transversal direction of the vehicle).

It should be noted, however, that also other embodiments of the tensioning device are conceivable. Instead of just one leaf spring, a number of spring members (e.g. leaf springs) could be positioned one a side another, for example. But also other tensioning devices than spring members could be provided. Basically, the tensioning effect provided by such tensioning devices could be the result of inherent properties of such tensioning devices (such as, for example, the elasticity of a used material (e.g. rubber or spring metal)), or could be the result of a specific structure (for example for evenly distributing a force over a length of the flexible member of the wind deflector).

In one embodiment, the leaf spring is preloaded for assuming a convex shape. The phrase "preloaded for assuming a convex shape" means, that the leaf spring will assume such a convex shape when it is not restricted, thus for example not yet mounted between the upper frame member and the flexible member of the wind deflector, or in a relaxed position within the recess.

For example, the leaf spring could be preloaded for assuming a convex shape towards the flexible member, wherein its central part is connected to the upper member. Such an embodiment of the leaf spring and its way of cooperation with the flexible member and upper frame member defines one embodiment for assuring in an effective manner that the flexible member is kept taut over its entire width.

However, the same result may be obtained, when the leaf spring is preloaded for assuming a convex shape towards the upper frame member, wherein its outer ends are connected to the upper frame member.

It should be noted that the phrase "connected to the frame member" also encompasses embodiments in which the respective parts of the leaf spring (central part or outer ends) abuttingly cooperate with abutment members provided on the upper frame member.

When such a leaf spring is provided and when the upper frame member is provided with a recess for movably housing said leaf spring, it is preferred that the leaf spring has an external width in the cross-sectional direction of the upper frame member closely matching the internal width of the recess in said cross-sectional direction.

Such a close match between the external width of the leaf spring and the internal width of the recess will prevent the leaf spring from tilting due to the forces acting thereon as a result from the tension of the flexible member.

It should be noted, however, that also alternative measures could be taken for preventing a leaf spring from tilting.

Basically, the wind deflector belongs to one of the following two types. A first type of wind deflector is the stationary type, in which the wind deflector always projects from the stationary roof part. In a second type, however, the wind deflector is of the type with an upper frame member which is movable between a retracted position and an extended position. In the retracted position, the upper frame member of the wind deflector normally will be retracted into a corresponding recess in the stationary roof part.

The edge of the flexible member remote from the upper frame member can be attached to a lower frame member which may be fixed to, or be an integral part of, the stationary roof part. However, it is conceivable too that the lower frame member also is movable relative to the stationary roof part.

Finally it is noted, that the flexible member can comprise an air-permeable mesh material.

Another aspect of the invention relates to a wind deflector constructed and intended for use in the open roof construction in accordance with the present invention.

BRIEF DESCRIPTION OF THE DRAWING

Hereinafter aspects of the invention will be elucidated while referring to the drawing. Herein:

FIG. 1 shows, schematically, a longitudinal cross-section (i.e. in the longitudinal direction of the vehicle) of an embodiment of an open roof construction in a first position;

FIG. 2 shows, again schematically, a perspective view of the wind deflector being part of the open roof construction of FIG. 1;

FIG. 3 shows a cross-section according to III-III in FIG. 2;

FIG. 4 shows a cross-section in correspondence with FIG. 1, however in a different position of the open roof construction;

FIG. 5 shows a perspective view in correspondence with FIG. 2, however in the position according to FIG. 4;

FIG. 6 shows a cross-section according to VI-VI in FIG. 5;

FIG. 7 shows a cross-section in correspondence with FIG. 1, however in still another position of the open roof construction;

FIG. 8 shows a perspective view in correspondence with FIG. 2, however in the position of FIG. 7, and FIG. 9 is a cross-section according to IX-IX in FIG. 8.

DETAILED DESCRIPTION

Firstly referring to FIG. 1, an open roof construction or assembly for a vehicle having a roof opening 1 (here closed) in a stationary roof part 2 of the vehicle is illustrated. A movable panel 3 is provided for selectively opening and closing said roof opening 1. The manner in which the movable panel 3 is moved, is known per se and thus will not be elucidated further within the context of this description.

At the frontal edge (for forward movement of the vehicle) of the roof opening 1 a wind deflector 4 is positioned. In the illustrated embodiment this wind deflector 4 is movable between a retracted position (FIG. 1) and an extended position (FIGS. 4 and 7). In the retracted position of the wind deflector 4 the movable panel 3 can be moved to a position for closing the roof opening 1.

In a way known per so operating means (for example a spring device 5) may be provided which move the wind deflector 4 from the retracted position towards the extended position. For example, in the present embodiment, the wind deflector 4 is held down in its retracted position by the movable panel 3 (when latter is in its closing position). When the movable panel 3 moves towards its opening position (see for example FIG. 4) it will disengage the wind deflector which, forced by means 5, will move towards its extended position. In a reverse order, when the movable panel 3 is moved towards its closing position, it will engage the extended wind deflector 4 and urge it towards its retracted position against the load defined by means 5.

It should be noted, however, that also other operating means for the wind deflector 4 could be realized; it even is possible that the present invention is implemented in an open roof construction with a stationary wind deflector, i.e. a wind deflector which always assumes an extended position and which cannot be retracted.

The wind deflector 4 is provided with an upper frame member 6 (only schematically indicated in FIGS. 1, 4 and 7 and better shown in FIGS. 2, 5 and 8). In the illustrated embodiment, in which the wind deflector 4 can be moved between a retracted position and an extended position, arms 7 are attached to the upper frame member 6 connecting it to pivots 8. It should be noted, however, that a movable wind deflector 4 not necessarily has to pivot, but also could perform a translational movement between its retracted and extended positions.

A flexible member 9, in the illustrated embodiment an air-permeable mesh material, is attached with one edge (its upper edge) to the upper frame member 6. In the illustrated embodiment, the edge of the flexible member 9 remote from the upper frame member 6 (i.e. its lower edge) is attached to a lower frame member 10 which, in the illustrated embodiment, is fixed to the stationary roof part 2, but which in an alternative embodiment, illustrated by lower member 10' in figure 4, too could be movable relative to the stationary roof part 2 (as is known per se in the art).

The attachment of the upper edge of the flexible member 9 to the upper frame member 6 does not occur directly but occurs by means of a tensioning means, in the present embodiment a leaf spring 11. As can be seen clearly in FIGS. 3, 6 and 9 (which show a cross-section of the upper frame member 6) such a leaf spring 11 is housed in a recess 12 provided in the upper frame member 6. In the illustrated embodiment the upper frame member 6 at least partially has a substantially inverted U-shaped cross-section, thus defining the recess 12 for housing the leaf spring 11.

In one embodiment, the leaf spring has an external width in the cross-sectional direction of the upper frame member 6 closely matching the internal width of the recess 12 in said cross-sectional direction. As a result, the leaf spring 11 can move in the recess 12, but is prevented from carrying out undesired movements, such as tipping-over.

In the illustrated embodiment, in which the leaf spring 11 is preloaded for assuming a convex shape towards the flexible member 9 (see FIG. 2) the central part of the leaf spring 11 is connected to the upper frame member 6 by connecting means 13 not shown in detail (for example screw, rivets, welding, adhesive etcetera), or it abuts a corresponding abutment of the upper frame member.

However, it is conceivable too that the leaf spring 11 is preloaded for assuming a convex shape towards the upper frame member 6. In such an embodiment the outer ends of the leaf spring 11 would be connected to the upper frame member by the connecting means 13 as described above (or abut abutments of the upper frame member).

It is noted, that "preloaded for assuming a convex shape" means, that in an unobstructed position the leaf spring 11 would assume such a position. Such an unobstructed position is, for example, illustrated in FIG. 2.

The operation of the inventive open roof construction now will be elucidated. When the movable panel 3 assumes its position for closing the roof opening 1, it engages the wind deflector 4 and keeps it in the retracted position (FIGS. 1, 2 and 3). In this position the flexible member 9 is not tensioned and the leaf spring 11 has assumed its convex shape.

When the movable panel 3 is moved towards its position for opening the roof opening 1, the wind deflector 4 is disengaged such that the upper frame member 6 thereof moves upwardly towards the extended position. The upward movement of the wind deflector 4 continues, until the central part of the flexible member is tensioned. A further upward movement of the wind deflector 4 then is not possible anymore. At this time the outer ends of the flexible member already have been tensioned, during which tensioning the corresponding outer ends of the leaf spring 11 are moved relative to the central part of the leaf spring 11 (i.e. the leaf spring 11 has moved from its convex shape in accordance with FIG. 2 towards its more longitudinal shape in accordance with FIG. 5). As a result the flexible member is kept taut over its entire width.

The movement of the outer ends of the leaf spring 11 occurs within the recess 12 defined in the upper frame member 6.

FIGS. 7, 8 and 9 show a position of the open roof construction which substantially corresponds with the position illustrated in FIGS. 4, 5 and 6. However, in this case a wind load W is acting on the flexible member 9. Notwithstanding this wind load W, however, the leaf spring 11 is acting to keep the flexible member taut over its entire width, although said flexible member may locally assume a convex position. In this respect it is noted, that taut does not exclude a non-planar shape of the flexible member.

Although the subject matter has been described in language directed to specific environments, structural features and/or methodological acts, it is to be understood that the subject matter defined in the appended claims is not limited to the environments, specific features or acts described above as has been held by the courts. Rather, the environments, specific features and acts described above are disclosed as example forms of implementing the claims.

The invention claimed is:

1. An open roof construction for a vehicle, comprising a roof opening which is provided in a stationary roof part of the vehicle, a movable panel for selectively opening and closing said roof opening, and a wind deflector positioned at the frontal edge of the roof opening, which wind deflector is provided with an upper frame member and a flexible member attached with one edge to said upper frame member, wherein the upper frame member is substantially rigid and the flexible member is attached to said upper frame member through a tensioning device configured for keeping the flexible member taut over its entire width.

2. The open roof construction in accordance with claim 1, wherein the upper frame member is provided with a recess for movably housing the tensioning device.

3. The open roof construction in accordance with claim 2, wherein the upper frame member at least partially has a substantially inverted U-shaped cross section.

4. The open roof construction in accordance with claim 2, wherein the tensioning device is a leaf spring.

5. The open roof construction in accordance with claim 4, wherein the leaf spring is preloaded for assuming a convex shape.

6. The open roof construction in accordance with claim 5, wherein the leaf spring is preloaded for assuming a convex shape towards the flexible member and has its central part connected to the upper frame member.

7. The open roof construction in accordance with claim 5, wherein the leaf spring is preloaded for assuming a convex shape towards the upper frame member and has its outer ends connected to the upper frame member.

8. The open roof construction according to claim 7, wherein the leaf spring has an external width in the crosssectional direction of the upper frame member closely matching the internal width of the recess in said cross-sectional direction.

9. The open roof construction in accordance with claim 1, wherein the upper frame member is movable between a retracted position and an extended position.

10. The open roof construction in accordance with claim 1, wherein the edge of the flexible member remote from the upper frame member is attached to a lower frame member.

11. The open roof construction in accordance with claim 10, wherein the lower frame member is one of fixed to and an integral part of, the stationary roof part.

12. The open roof construction in accordance with claim 10, wherein the lower frame member is movable relative to the stationary roof part.

13. The open roof construction in accordance with claim 1, wherein the flexible member comprises an airpermeable mesh material.

* * * * *